United States Patent Office 3,506,537
Patented Apr. 14, 1970

3,506,537
PROCESS AND APPARATUS FOR THE MANUFACTURE OF FIBROUS-CEMENT SLABS, PARTICULARLY OF ASBESTOS-CEMENT SLABS
Giorgio Marchioli, Via G. B. Morgagni 22, Milan, Italy
Filed Oct. 10, 1966, Ser. No. 585,690
Claims priority, application Italy, Oct. 14, 1965, 10,125/65
Int. Cl. C04b 15/16
U.S. Cl. 162—154                                11 Claims

ABSTRACT OF THE DISCLOSURE

In making fibrous-cement slabs, a shaped surface matching the desired shape and outline of the slab to be made is lowered into a tub containing a fibrous-cement slurry. Vacuum applied to the shaped surface draws on the slurry to form a layer of fibrous-cement paste on said shaped surface. The fibrous-cement layer is subsequently removed from the slurry tub and subjected to a scraping action, whereupon the layer is transferred onto a mold and carried to a press means for dehydration, thereby to form a slab.

---

This invention relates to a process and an apparatus for the manufacture of shaped fibrous-cement slabs, more particularly asbestos-cement slabs, using a diluted suspension of fibres and cement in water.

In the ensuing disclosure, the term "shaped" is intended as employed in its broadest acception and thus it will be used both for connecting slabs having a profiled outline and slabs having a worked surface, and, more particularly, corrugated slabs.

The method which is at present more extensively and conventionally adopted for the manufacture of asbestos-cement slabs resorts to the well known Hatschek process which comprises the steps of producing flat slabs of a plastic fibrous-cement slurry by superposing individual layers thereof on a shaping cylinder fed by a felt web and subsequently severing all of them by a cut along a generating line of said cylinder.

The slabs are then forwarded to a shaping press wherein they are generally corrugated and squared out so as to form a trimmed slab, subsequently produced slabs being alternately stacked with patterns and allowed to stand, so stacked, for a time sufficient to complete setting and initial hardening.

This conventional method involves many a shortcoming and, above all, the drawback of exhibiting, in the slab-forming layers a marked preferential orientation of fibres in the machine direction of the slab, as a result of the entraining effect due to the felt web which feeds the slurry to the shaping cylinder, thus entailing a considerable decrease of the mechanical strength of the slab in the "across" direction. Differences as large as 50% between the mechanical resistances in the "along" and "across" directions have been reported.

Another defect inherent in said conventional method lies in that the shaping step is carried out by deformation of the slab subsequently to its conformation in plan. Said deformation does indeed give rise to internal stresses conducive to creases and breakages of the slab layers and these defects are particularly marked in the maximum stress areas such as at the tops of the corrugations. The drawback could be reduced by resorting to a binder, more particularly asbestos, having a long fibre structure and by substantially limiting the pressure imparted to the slab during shaping. The first limitation is, in the first place, a disadvantage from an economical standpoint as the long-fibre binders are generally more expensive, whereas the second limitation acts in such a way that, on account of the slackened pressure, the slabs may still retain, upon shaping, a high water percentage, that which considerably jeopardizes the setting and hardening process of the compound thus impairing the final mechanical features and imperatively requires the use of patterns laid down alternately with the slabs in composite stacks during the setting time of said slabs.

Still further drawbacks of the conventional method outlined above lie in the difficulty of handling the "flats" as produced by the shaping cylinder to transfer them to the subsequent processing steps, in the difficulty of obtaining multi-ply slabs of an even thickness and also in the considerable periods of time which are necessary for shaping and transferring said slabs.

A vital object of the present invention is to provide a process which permits an improved, quicker and cheaper production of fibrous-cement slabs.

More particularly, an object of the present invention is to provide a process which permits, in the initial step thereof, the formation of a compact layer of fibrous-cement slurry, particularly asbestos-cement slurry, wherein the fibres have any random arrangement and dispersion within the slurry without any preferential orientation, so as to give rise to a slab having substantially equal resistances to mechanical stresses imparted along orthogonal directions.

A further object of the present invention is to provide a process in which the shaping of the above mentioned compacted layer takes place without inducing any internal stresses and consequent damages to the slab so as to make possible the use of short-stapled binders, more particularly short-stapled asbestos in order to achieve a cheaper production run.

An additional important object of this invention is to provide a process by means of which, upon completion of the shaping and forming steps, the slab contains an amount of water which is necessary to the progress of the subsequent process of setting and initial hardening with the utmost efficiency.

Another object of the invention is to provide a process which does not require the handling of the slabs when they are still in a plastic condition to transfer them from the shaping station to the subsequent forming and pressing stations.

Other objects of the invention are to provide a process requiring the use of simplified and less bulky installations which are such as to permit a considerable versatility of production, said versatility being intended in terms of the possibility of using said installations, without substantial changes, for specific productions which can be varied widely within a unit of time.

These and other objects, to be mentioned in the ensuing description, are achieved according to the present invention by a process comprising the steps of shaping and simultaneously forming a thick layer of slurry by sucking it with the aid of a shaping and forming suction-cup to be immersed in a very diluted suspension of fibres and cement, withdrawing said suction cup from said suspension with a fibrous-cement layer held by continuous sucking onto its active surface, laying said layer on a geometrically conjugated mould, subjecting the mould with at least one layer of fibrous-cement resting thereon to a compressive action so as to obtain a squeezed out slab and transferring said slab to a stack formed by like slabs only to complete the setting and initial hardening step.

This process has the paramount advantage, over the conventional Hatschek method aforementioned, of permitting the simultaneous shaping and forming of the plastic fibrous-cement slurry on the active lower face of a suction cup whose size and outline exactly match those of the expected slabs. Said shaping and forming of the layer by direct suction is conductive, moreover, to a uniform distribution of the binder fibres which place themselves at random without any preferential orientation.

To improve the dispersion of the fibres in the fibres-cement slurry, the latter is fed, with advantage, into a collecting tub by pumping from beneath and is renewed after each suction step effected by the shaping suction cup.

The invention will now be described in detail with reference to the accompanying drawings which are non-limiting examples of an apparatus adapted to produce slabs with the process outlined above.

FIGURES from 3 to 6 are diagrammatical views of the apparatus in front view, partly in section, during progress of the several subsequent manufacturing steps of a corrugated asbestos-cement slab.

Figure 7:
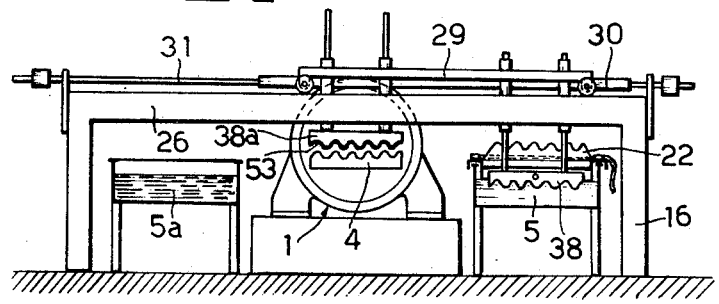

FIGURE 7 is a diagrammatical showing in front view and partly in section, of a modification of the apparatus.

Figure 8:
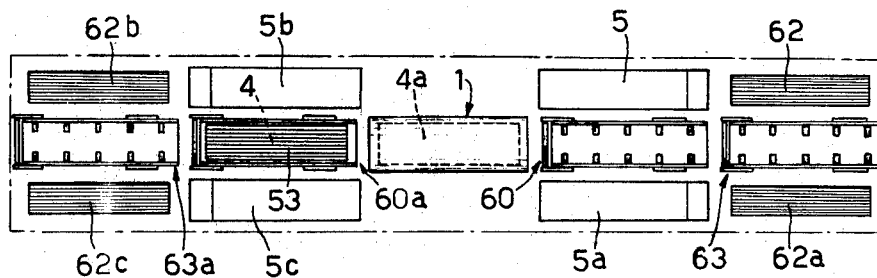

FIGURE 8 is a top view of an installation using the apparatus shown FIG. 7, and

Figure 9:
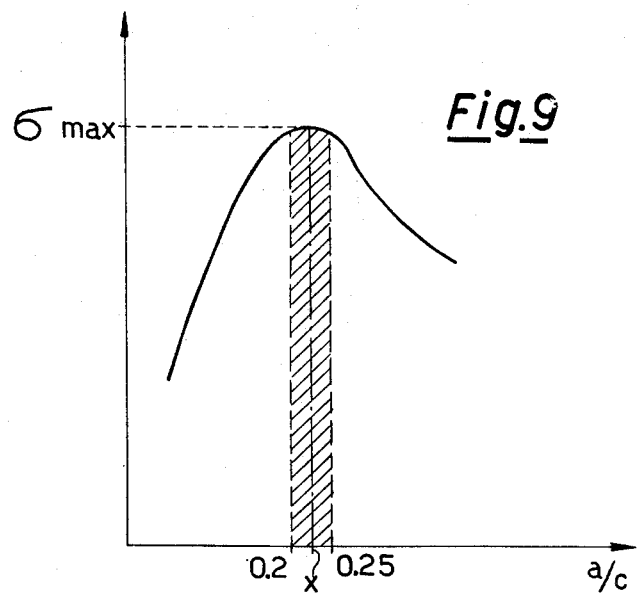

FIGURE 9 is a plot which illustrates, for further clarification, the resistance curve of a cement as a function of the water percentage in the slurry.

Having now reference to the FIGURES 1 to 6 inclusive, the apparatus essentially comprises a first section for shaping and forming the layers of thick fibrous-cement slurry and for the transfer thereof, and a second section for pressing, which includes a press adapted to receive said layers and to subject them to a compressive and dehydrating action so as to obtain the expected corrugated slab.

The portion of the installation which is provided for the formation of the layers of fibrous-cement slurry and for transferring them to the pressing section, comprises a tub 5 having a length and a width slightly in excess over those of the slabs to be manufactured. In its front portion the tub 5 communicates, via a sloping section 6, with a second tub 7 situated at a level below that of tub 5. Between the tub 5 and the sloping section 6 a movable transversally oriented gate 8 placed near the tub bottom so as to confine a slot 9 therewith. The tub 7 has a transversal partition wall 10 and, coplanar with the latter, a gate 11 is placed and spaced apart therefrom.

A piping 12 for feeding the aqueous asbestos-cement slurry opens into the tub 7, whereas a piping 13 connects said tub with the intake manifold of a pump 14, driven by a motor 15 and capable of forwarding the slurry via a piping 16 to the rear portion of the tub 5. Piping 16 opens at the tub's bottom so that the slurry is fed by pumping from below. The slurry contained in the tub 5 passes through the slot 9 and the sloping section 6 into the tub 7 and the delivery rate of the pump 14 is metered as a function of the width of the slot 9 in such a way that the level in the tub 5 is substantially constant.

A possible excess slurry can straddle over the gate 8. By so doing, during progress of the formation of the layer a constant circulation of the slurry is achieved, as will be explained hereinafter, with a uniform, not too vigorous movement at a speed of about 20 metres a minute, it being understood that said value is given by way of example only and that the circulation of the slurry is to occur, in any case, so as to have a not too intensive flow of the slurry in the tub 5.

Upon completion of said shaping step, the residual slurry is preferably dumped by depressing the gate 8 and the feed to the tub 5 is renewed so as to ensure the uniformity of the slurry intended to form the following slabs.

The slurry, fed through the piping 12 and prepared separately, can have a composition of, say, 100 parts cement and 14 parts of asbestos fibres in about 500 parts of water.

Asbestos-cement lumps possibly formed in the slurry and sedimented in the tub 5, are dumped and collected in the first portion of the tub 7 as confined by the partition wall 10, wherefrom they are withdrawn from time to time.

Figure 1:
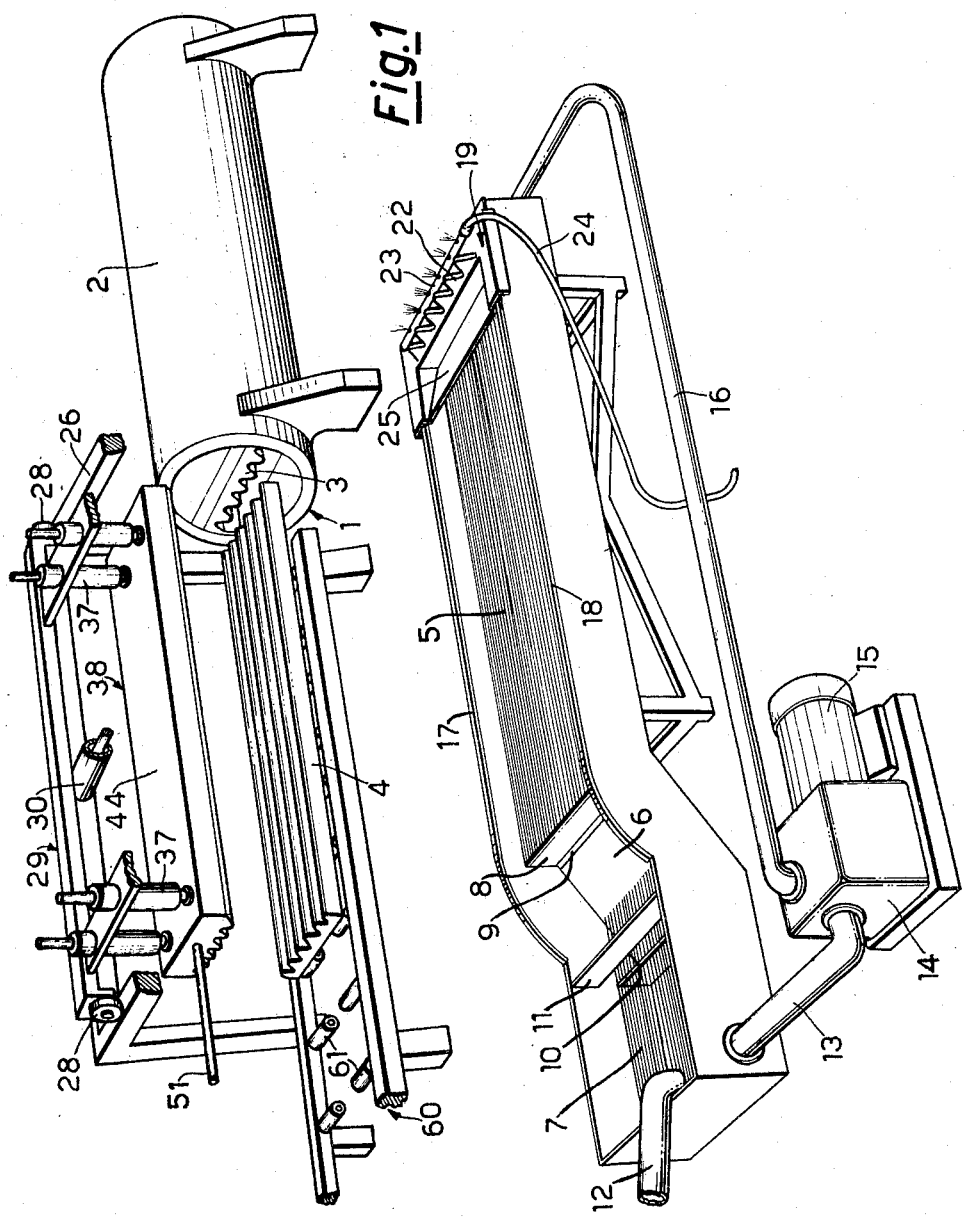
FIGURE 1 is a diagrammatical perspective view of the essential component parts of the shaping and pressing devices, respectively.
Figure 2:
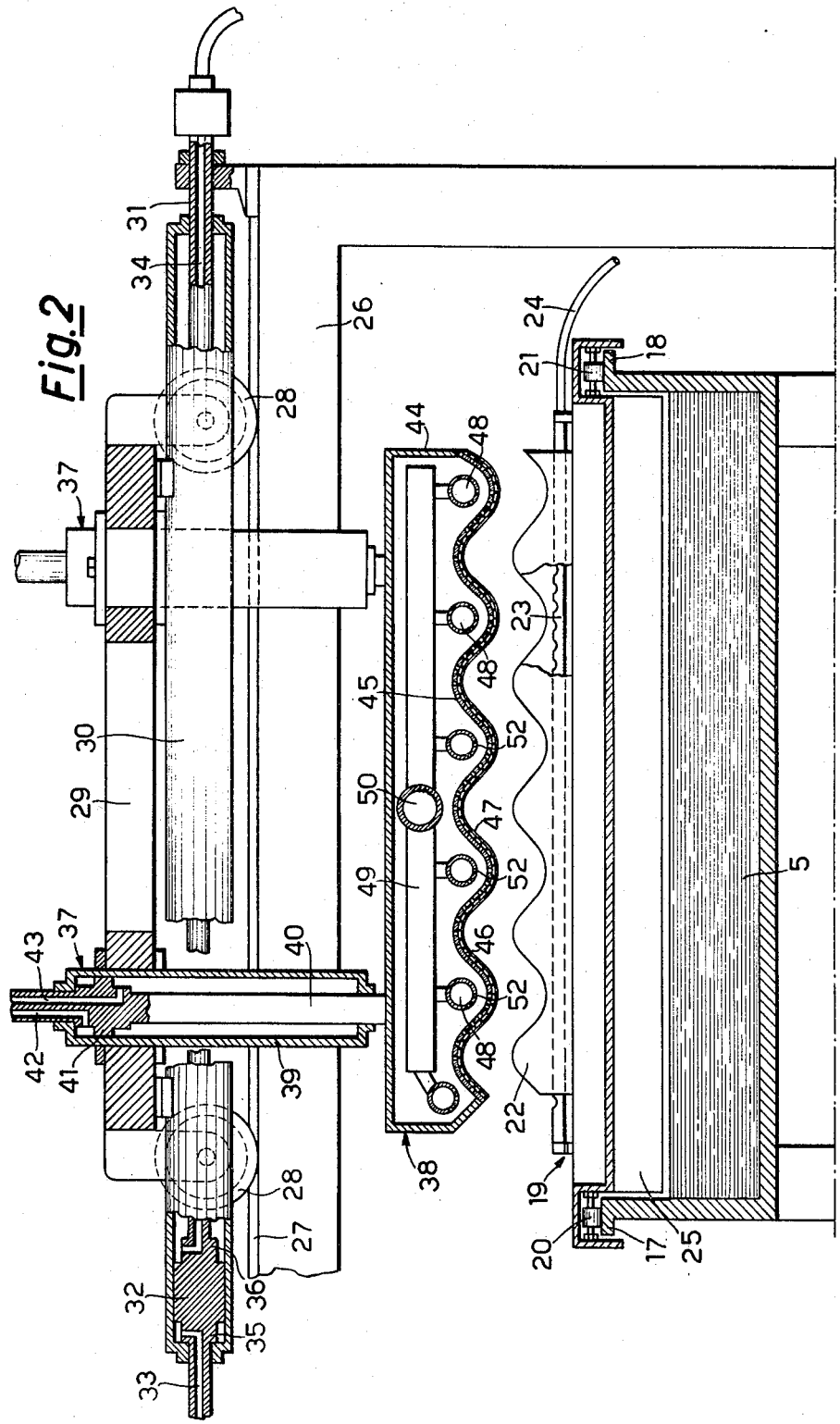
FIGURE 2 is a cross-sectional view of the shaping section only.

As viewed in FIG. 1 and more particularly in FIG. 2 which is a cross-sectional view taken approximately midway of the tub 5 and in which the press forming a portion of the second section of the apparatus has not been shown, the upper edges of the tub sidewalls act as guides 17 and 18 for a carriage 19 which is translated, by means of rollers 20 and 21, from a back position (FIG. 1) at the rear end of the tub, to a front position at the front end portion of the guides 17 and 18 which is sloping concurrently with the upper edges of the sidewalls of the sloping portion 6; the displacement of the carriage from either position to the opposite being advantageously effected by automatic controls (not shown).

The carriage 19 carries a squeegee 22 for levelling out the sucked layer and a piping 23, with a plurality of upwardly facing nozzles, into which water can be fed by a hose 24. A collecting space 25 is provided before the squeegee 22 on the carriage 19.

The tub 5 has an overhead transversally arranged framing 26 with guides wherein a carriage 29 can slide by means of wheels 28.

A hydraulic ram 30, solid with the carriage 29, is catered for, for displacing the latter.

A rod 31, affixed to the framing 26, passes through the ram 30 in a sealtight manner and carries a piston 32 centrally positioned therein. A pressurized fluid can be fed through coaxial bores 33, 34 formed through the stem 31 and which open radially in the ram 30 on both sides of the piston 32. It is apparent that, by feeding pressurized fluid through the bore 33, the other bore 34 is connected to sump and the ram 30, with the carriage 29, will be translated away of the position illustrated at the left side of FIG. 2. When, contrariwise, pressurized fluid is fed through the bore 34, the other bore 33 is connected to sump and the ram 30, solidly with the carriage 29, is dispaced rightwards. The end of stroke on either side is determined by the abutment of the bottom walls of the ram 30 against attendant lateral projections 35 and 36, respectively, of the piston 32. It is understood that the feed of pressurized fluid on either side of the ram 30 can be controlled, for example, by means of magnetic valves (not shown) and that the stopping of the ram 30 with its carriage 29 in the desired position can be controlled by microswitches (not shown).

To the carriage 29 is hung, by means of hydraulic rams 37, a suction cup generally indicated at 38 in the drawings. The hydraulic rams 37 comprise a cylinder 39 solid with the carriage 29, a rod 40 whose lower free end is affixed to the cup 38, a piston 41 solid with the rod 40 and intake ducts 42 and 43 for the pressurized fluid, opening into respective opposite sides of the piston 41 in the cylinder 39. When the duct 42 is under pressure, the duct 43 is connected to sump and vice versa. The intake of pressurized fluid into either duct 42 (or 43) is controlled in any conventional way.

It is obvious that all the rams 37, of which, say, four can be provided, are controlled in simultaneous attunement.

The suction cup 38 consists of a hollow body 44 having a substantially prismatic outline having a bottom face, to be called "active surface" in the following, which is substantially water-pervious only. Said pervious surface is formed by a foraminous metal sheet 45, on whose outer face a gauze 46 is tightly affixed, the latter being preferably lined in its outer face by a fabric 47. The fabric should be such as not to allow an easy passage to cement. A synthetic fibre cloth has proven to be suitable, for example. Within the hollow body 44 pipings 48 are arranged parallely of the longitudinal axis of the body and connected to one or more transversal manifolds 49, the latter being connected to a main longitudinal manifold 50. Manifold 50, by an external pipeline 51, is connected with a suction pump (not shown).

Pipes 48 have, along a few generating lines, pluralities of holes 52 facing downwardly.

In the second part of the apparatus, any conventional press, adapted to press the "green" layer of fibrous-cement slurry to the desired extent, can be used.

By way of example, the drawings diagrammatically illustrate a conventional press 1 which is the subject-matter of Italian Patent No. 626,883. It is thus redundant to describe in more detail the construction and operation of said known press, it being enough to recall that it comprises a tubular body 2 in which an upper mould 3 is contained, adapted to be pressed, with a large uniform pressure, against a lower mould 4 to be inserted in the same tubular body 2 and intended to receive the fibrous-cement stock to be pressed. The upper and the lower mould have their confronting surfaces shaped, i.e. corrugated in the case in point.

After having detailedly described the individual component parts of the apparatus, the cyclical run of the individual steps of the process worked with said apparatus will be described later in connection with the preparation of an asbestos-cement corrugated slab, particular reference being had to FIGURES 3 to 6 of the accompanying drawings.

The cycle is started by filling the tub 5 up to the desired level with a separately prepared slurry of cement and asbestos in water. The pump 14 causes said slurry to be maintained in slow circulating movement.

The carriage 29 is displaced towards the right with its suction cup 38 lifted above the tub 5.

The suction cup 38 is lowered by means of the hydraulic rams 37 until dipping its active surface in the slurry contained in the tub 5. It should be noticed that, inasmuch as corrugated slabs are to be manufactured, the active surface, i.e. the foraminous metal sheet 45, the gauze 46 and the cloth 47, have a corrugated outline matching the profile of the slabs to be produced. The same outline has the squeegee 22, to be illustrated later, and the mould 4 as well.

Figure 3:
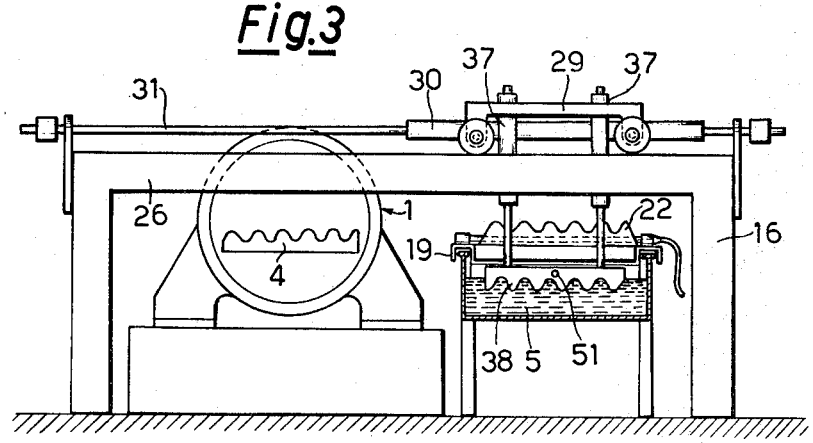
Figure 4:
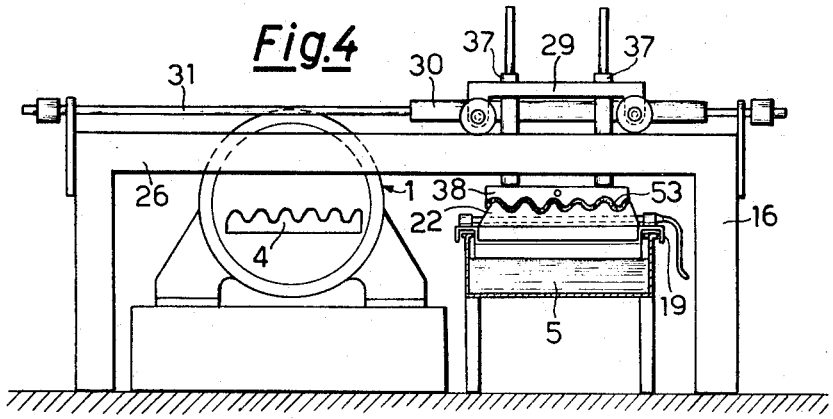
Figure 5:
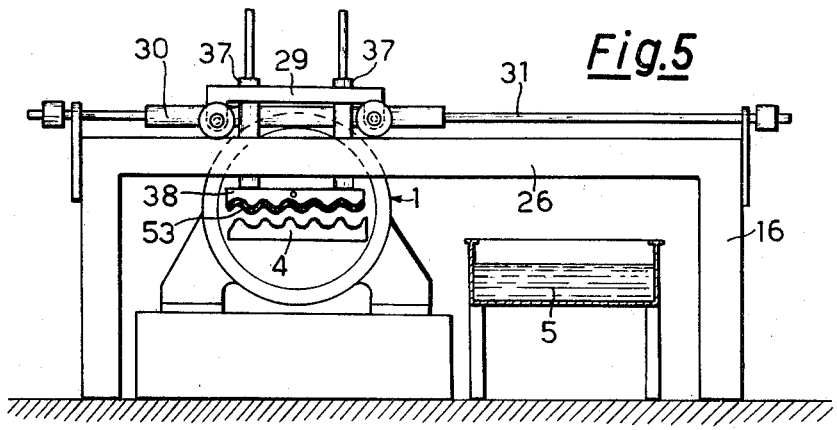

The apparatus thus takes the position shown in FIG. 3.

With the suction cup 38 dipped in the aqueous asbestos-cement slurry, suction is caused to occur by means of the pump connected to the piping 51. As a result of said suction, a thick layer of aqueous asbestos-cement paste, having its elementtary fibres arranged on surfaces which are orderly parallel to the active surface and substantially evenly oriented in all directions, is deposited on the active surface of the suction cup.

The layer of paste formed on the active surface of the suction cup 38 asymtotically tends towards attaining a maximum thickness as time goes, while said active surface (under a negative pressure) is dipped in the slurry. By way of example, it can be said that values adapted to give a layer having a very satisfactory homogeneity within a reasonable time, are 1 cm. thickness of the layer assembled during a time of less than one minute.

Upon attaining the desired thickness of the layer on the active surface, the suction cup 38 is lifted, while still maintaining a negative pressure therewithin so as to retain the asbestos cement layer adherent to said active surface.

In order that an absolute evenness of the outer (lower) face of the asbestos-cement layer collected on the cup may be safeguarded, it could be adjustable to effect, at this stage, a scraping out step. For this, a squeegee 22 is catered for on the carriage 19 which latter, during the processing steps described up to now, was in its backward position at the rear end of the tub 5. The carriage 19 is thus caused to slide forward and, during this movement, the squeegee 22 with its upper scraping edge, strips from the asbestos-cement layer, indicated at 53 in FIG. 4, which diagrammatically illustrates this step, the material in excess of the desired thickness, said excess material being collected in the space 25, specially provided on the carriage 19. The thickness of the asbestos-cement layer left adherent to the active surface of the suction cup 38, is determined by the distance between said active surface of the suction cup when the latter is lifted above the tub 5, and the scraping edge of the squeegee 22, it being obvious that said thickness can be varied by adjusting the level at which said suction cup is lifted. It is obvious, furthermore, that the outline of the scraping edge of the squeegee 22 should match that of the active surface of the suction cup 38 and that the latter should be in such a position that the two outlines may be matched thoroughly.

At the end of its forward stroke, the carriage 19 is pushed down on the sloping terminal portion of the guides 17 and 18, and the material collected in the space 25 is dumped into the tub 7, beyond the gate 11, to give recycled with the fresh material fed by the piping 12.

On completion of this scraping stage, the carriage 29 is shifted laterally with the suction cup 38 still lifted and under a negative pressure so as to retain the asbestos-cement layer 53 adherent thereto. Said lateral displacement is effected by properly controlling the feed of pressurized fluid into the double-acting ram 30.

The carriage 29 is laterally displaced so as to bring it in vertical alignment with the lower mould 4 as withdrawn from the press 1 and positioned in lateral adjacency with respect to the tub 5, on a suitable supporting member, such as a flat 60 equipped with sliding rollers 61.

It should be noticed that, in the position of alignment with the mould 4, the suction cup 38 is spaced a short distance apart from said mould, the value of said distance being a minimum consistent (see FIG. 5) wtih the requirements of shifting the suction cup aforesaid away of the space occupied by the tub 5. FIGURE 1 shows the suction cup 38 slightly spaced apart above the mould 4, for clarity purposes only.

The asbestos-cement layer 53 is then placed on the mould 4 by merely dropping it, or also by laying it directly over the mould, causing the suction cup 38 to descend with the aid of the hydraulic rams 37. The asbestos-cement "green" layer is readily separated from the filtering surface of the suction cup by bringing the inside thereof to a pressure which is equal to, or slightly above, the ambient pressure.

Upon placing the layer 53 on the mould 4, the carriage 29, with the suction cup 38, is restored to its home position above the tub 5 by the agency of the hydraulic ram 30. Once said position has been reached, also the carriage 19 is restored to its home position and during this return stroke, water is fed through the hose 24 to the pipe 23 so as to cause washing water jets, coming from the nozzles of the pipe 23, to impinge onto the active surface of the suction cup 38 in order to strip therefrom any possible asbestos and cement particles liable to diminish the perviousness thereof.

Figure 6:
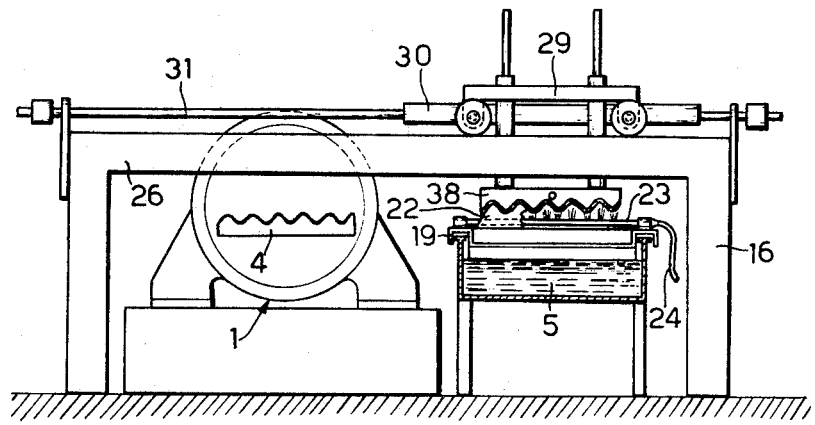

On completion of this step, as shown FIG. 6, the apparatus is restored to its initial conditions again and is in readiness for a subsequent dipping of the suction cup 38 in the tub 5 so as to start a subsequent shaping and forming cycle of a layer of asbestos cement paste.

Meanwhile, the lower mould 4, with the asbestos-cement "green" layer laid thereon as aforesaid, is introduced into the press 1 to carry out the dehydrating compression steps, the latter taking place in quite conventional a way.

The pressure imparted by the press varies as a function of the cement used and the composition of the slurry and is, in any case, brought to the limiting value which is necessary for the most proper dehydration and subsequent setting of the paste to occur. With reference to the plot of FIGURE 9, giving the compression resistance of a cement after setting, vs. the percentage ratio water/cement of the slurry said dehydration limit is the one defined by the value taken by the water/cement ratio which corresponds to the maximum ordinate.

Merely by way of example, and having reference to a slurry having a percentage composition as defined above, said dehydration limiting value, generally ranging from 0.2 to 0.25 for the water/cement ratio, is attained by using a pressure comprised between 80 and 90 kgs./sq. cm.

As they come out of the forming press, the slabs are shifted, for example with a conventional suction cup lifting device, to a setting and initial hardening station. In this station, the slabs are stacked in direct contact with each other in the inside of sealtight containers, of the kind described in a previous patent application by the same applicant and in which, in completion of the setting process, water is fed, preferably at a temperature of about 40° C.

By so doing, the subsequent hardening of the slabs is brought about under the theoretical conditions of maximum efficiency and the slabs, as obtained on completion of the processing run, exhibit extremely good mechanical properties.

It is of course possible to form each slab, instead of a single-ply layer as produced by the suction cup 38, as a multi-ply slab, the several superimposed layers being successively laid on the mould 4 before introducing the latter in the press 1.

If so, and, in general, whenever an acceleration of the production run of single-ply slabs is desired, an arrangement is advantageous such as depicted in FIG. 7, wherein the carriage 29 is equipped with two suction cups, 38 and 38a, respectively, spaced apart from one another by a gap equal to the transfer pitch of each suction cup from the tub 5 to the mould 4, the suction cup 38a cooperating with its attendant tub 5a.

This modification of the apparatus, having tubs located in side-by-side relationship, is of particular advantage in an installation layout as diagrammatically shown in FIG. 8 wherein four tubs, 5, 5a, 5b, 5c, respectively, are placed side-by-side in couples at the opposite ends of a single central press 1. The couples of tubs are separated by a first rollered conveying table, 60 and 60a, respectively, to be followed, each, by setting and initial hardening stations formed by a couple of containers 62–62a (and 62b, 62c, respectively) separated by a second rollered conveying table 63, and 63a, respectively.

For each couple of tubs a carriage (not shown) is catered for, very much the same as the twin-suction-cup carriage shown FIG. 7, conventional stacking devices (not shown) being additionally provided at the setting and initial hardening stations.

With the above described arrangement, the two shaping and forming suction cups 38 and 38a of each carriage 29 are operatively phase-shifted in that when either cup is dipped in its attendant tub for the formation of an asbestos-cement layer, the other one lays down the formed layer on the mould 4 and vice versa.

The mould 4 is then alternately fed at the two opposite ends of the press 1 which thus dumps the pressed slabs alternately on opposite sides, to forward them, along with the mould, to the stacking stations. The simultaneous use of two moulds is provided for, one of which, 4a is in the press 1 when the other, 4, is beneath either shaping suction cup.

Upon pressing, the mould 4a is shifted towards the table 63 whereas the mould 4, carrying the deposited layer, enters the press 1. Subsequently, the stripped mould 4a reaches the table 60 to receive a new mould and the mould 4 is shifted towards the table 63a to dump its pressed layer. A new cycle is started when the mould 4 is returned to the table 60a as shown in the drawing. During shifting of the moulds the intermediate scraping off operations are performed on the layers sucked by the suction cups, said cups being concurrently washed.

The use of twin-suction-cup carriages 29 permits, moreover, the formation of multi-ply slabs having layers with different characteristics, such as, dyed surface layers.

Dyeing can be carried out, in such a case, in bulk in one of the tubs 5 or 5a, 5b or 5c of each couple.

Water sucked by the cups can be reused for preparing the slurry to be fed to the tub. The relatively small capacity of the tub permits moreover a batch-process operation of the installation, thus avoiding night shifts, which are imperative when the fluid masses are considerably bulky and a premature setting of cement is to be prevented.

Obviously, the active surface of the suction cup can have a shape other than the corrugated one for obtaining other forms of articles, more particularly for obtaining flat slabs. The formation of the asbestos-cement paste layer effected on a surface which already has the shape of the expected article of manufacture, in addition to overcoming the subsequent warping of the layer and attendant creasing thereof, is such as to prevent the formation of trimmings which, in the conventional processes, are usually recycled, thus jeopardizing the homogeneousness of the slurry.

The foregoing disclosure, moreover, makes it quite clear that the formation of layers on the active surface of the suction cup takes place with rapidity, a fact which entails a considerable gains of time when carrying out the several steps of the whole process run.

Obviously, premising that the basic principle of the invention is kept unaltered, the operational details of the process and the embodiments of the implementation can be modified as compared with that which has been exemplarily described herein without any understood limitation, without therefor departing from the spirit and scope of this invention.

What is claimed is:

1. A process for making fibrous-cement slabs comprising the steps of providing a surface element having a shaped surface conforming to the desired shape and outline of the slab to be made, translating said surface element to a position to dispose said shaped surface in a fibrous-cement slurry, applying a vacuum to said shaped surface, drawing on the slurry to form a layer of fibrous-cement on said shaped surface, translating said surface element to a position to remove said shaped surface and fibrous-cement layer from said slurry, scraping the exposed surface of said fibrous-cement layer, transferring said fibrous-cement layer to a mold having a surface corresponding to the shape and outline of the slab to be made, applying a compressive force to said fibrous-cement layer to dehydrate the latter and form a slab, and transferring said slab to a stack of like slabs for setting and initial hardening.

2. Apparatus for making fibrous-cement slabs comprising a collecting tub, means for feeding an aqueous fibrous-cement slurry to said tub, suction means having a shaped active surface matching the desired shape and outline of the slab to be made, operable means for translating said suction means between a position above said collecting tub and a laterally displaced position disposed above a mold, said operable means being operable to lower said suction means to dispose said shaped surface into the fibrous-cement slurry, said suction means having vacuum means operable to apply a vacuum to said shaped surface whereby when the latter is disposed in said slurry, the vacuum draws on the slurry to form a layer of fibrous-cement paste on said shaped surface, scraping means operable to scrape and smooth out said fibrous-cement layer, said suction means being operable to release said fibrous-cement layer to deposit the latter on said mold after said layer has been scraped, and press means operable to receive said mold and fibrous-cement layer to subject the latter to compression.

3. An apparatus according to claim 2, wherein said scraping means consist of a squeegee having a shaped uppermost edge whose outline matches that of the active surface of said suction means, and a carriage supporting said squeegee adapted to slide over the edges of said tub.

4. An apparatus according to claim 3, wherein said squeegee-carrying carriage has a pipe for feeding washing water for the active surface of said suction means, said pipe being equipped with sprinklers.

5. An apparatus according to claim 2, wherein said suction means is carried by a carriage which is slidable on guides of an overhead frame arranged transversely of said tub.

6. An apparatus according to claim 2, wherein said collecting tub cooperates with an ancilliary tub to which the fibrous-cement slurry is fed and into which the excess and residue slurry held in said collecting tub are dumped.

7. An apparatus according to claim 6, wherein said tub and said ancilliary tub are separated by a sloping section, by a first tiltable gate at the upper end of said section and by a fixed partition wall which defines, at the lower end of said sloping section, a collecting space for the lumps which cannot be directly recycled.

8. An apparatus according to claim 2, wherein the active surface of said suction means is formed by a foraminous sheet metal whose outer face is wrapped by a gauze, the latter being covered, in turn, by a fabric.

9. An apparatus according to claim 5, wherein there are two suction means supported by said movable carriage, spaced apart by a distance equal to the amount of transverse shifting movement of said carriage and alternatively cooperating, each, with an attendant collecting tub.

10. An apparatus according to claim 5 wherein there are two carriages, each of which is equipped with two suction means cooperating with a couple of related collecting tubs arranged at the opposite ends of a single central press means, means for conveying the formed layers alternately to said press means at each end thereof, and means for shifting the molds after pressing the layers, to setting and initial-hardening stations.

11. An apparatus according to claim 10, wherein there are two setting and initial-hardening stations in alignment with said two collecting tubs and behind the latter with respect to said central press means.

References Cited

UNITED STATES PATENTS 2,371,313    3/1945    Rast et al. _____ 162—125
2,704,493    3/1955    Randall _____ 162—224 X

FOREIGN PATENTS 939,420    10/1963    Great Britain.

HOWARD R. CAINE, Primary Examiner

U.S. Cl. X.R.

162—224, 388; 264—87